March 15, 1966     W. B. HOELSCHER     3,240,344
HORIZONTAL PLATE FILTER APPARATUS Filed Jan. 15, 1963     3 Sheets-Sheet 1

United States Patent Office 3,240,344
Patented Mar. 15, 1966

3,240,344
HORIZONTAL PLATE FILTER APPARATUS
Wolfgang Bernhard Hoelscher, 27 Alexandraweg,
Darmstadt, Germany
Filed Jan. 15, 1963, Ser. No. 251,702
3 Claims. (Cl. 210—340)

The present invention relates to filter apparatus. More specifically, this invention is concerned with a filter device which is substantially composed of a plurality of filter plates and cover and bottom plates, all held in place by clamping means.

Such filter devices are generally used for the filtration of liquids and, in particular, for very fine filtration of chemical liquids and solutions, lacquer, sirup, beer, etc., and to recover solids from suspensions.

Basically, filter devices having horizontal filter surfaces are designed in either of two ways. In filter apparatus of the first type the sludge is passed into an enclosure or chamber in which a plurality of filter plates are arranged, the resultant filtrate being centrally drained. In this filter system, ventilation of that part of the system where the filtrate is obtained is often difficult. Moreover, the liquid flow is severely slowed down because of the abrupt change in cross-section as the fluid flows from the feed tube line into the chamber. Thus, in many cases the kinetic energy is reduced to such an extent that heavier particles cannot be held in suspension for a period of time sufficient to allow them to settle on the filter plates.

In filter apparatus of the second type, the reversed direction of flow is utilized. That is to say, the liquid to be filtered is directed to the center of the filter plates, whence it flows in radial direction along the individual filter plates and enters the chamber or container at the outer periphery of the filter plates. Here, ventilation of that portion of the filter system in which the sludge is contained, is virtually impossible. Hence, also in this case a uniform flow on which the design of uniform filter surfaces is based, cannot be attained. Another disadvantage of this filter system is the constricted outlet area of the tube line conveying the sludge to the center portion of the filter plates. Due to this constriction, the sludge enters the filter plates at a relatively high velocity, which may cause the filter cake to be washed away. Hence, prefabricated filter beds of sufficient thickness have to be used, which are considerably more expensive than simple filter paper.

Moreover, both filter systems are unfavorable, inasmuch as mounting elements as bolts, brackets, and other parts provided with threads or interacting in similar mechanical manner have to be accommodated in the liquid chamber, thereby promoting corrosion and similar detrimental effects.

It is accordingly a primary object of the invention to provide a horizontal plate filter apparatus of such arrangement and size as to insure optimum flow conditions.

It is another object of the invention to provide a horizontal plate filter apparatus with an inlet aperture that does not disturb the sedimentation process, at the same time promoting reflux of the sludge upon completion of the filtration process.

A further object of the invention is to provide filter plates as well as cover and bottom plates of such a configuration as to permit utilization of the filtering means for sealing purposes.

Still another object of the invention is to provide a horizontal plate filter apparatus which is equipped with clamping means arranged outside the passages of the liquid flow, the inlet and outlet passages for the slurry and the filtrate, respectively, being incorporated in the filtering means in such a way as to permit the filter apparatus to be manufactured at low cost.

Finally, it is an object of this invention to provide a filter apparatus such that the liquid passes through each filter bed only once.

The objects set forth above are attained with particular features characteristic of the filter apparatus of the present invention.

According to one feature, filter plates of preferably circular shape are disposed between the cover plate and the bottom plate of the filter apparatus, the cover and bottom plates having a special configuration permitting them to perform the functions set forth in the objects.

Another feature of the invention is that each filter plate has an intermediate bottom, which is impervious to liquid and is slightly inclined toward the horizontal.

Still another feature of the invention is that each inlet passage incorporated in the filter plates extends through the outer portion of the plate thereby communicating with the interior below the associated intermediate bottom while the outlet passage provided in the outer portion of the filter plate is in communication with the interior above the associated intermediate bottom.

The intermediate bottoms are provided with small projections or lugs carrying a screen, which, in turn, carries the filtering medium as filter paper. This paper is of about the same cross-sectional area as the filter plate and, according to the invention, covers the wall regions of the inlet and outlet passages, while it is cut out at such points where it would cover the open passage areas.

The so designed filter plates are secured to a cover plate and a bottom plate by externally located clamping means, thereby forming a complete filter apparatus having the following advantages:

The flow conditions are most favorable because of the elimination of radial flow through the system. The liquid to be filtered is passed through the filtering medium only once and is then conveyed directly to the outlet because of the slightly inclined intermediate bottoms.

The influx is guided in such a manner that sedimentation in the inlet regions is not disturbed. Thus, the inlet aperture is preferably of such configuration that the greater part of the sludge remaining on the filtering medium may flow back through the inlet aperture upon completion of the filtering process. Moreover, the filter paper is advantageously utilized in sealing the filter plates against the exterior, at the same time providing sealing of the wall regions of the inlet and outlet areas.

Further advantages of the invention will become apparent from the following description in conjunction with the appended drawings wherein FIGURE 1 shows the complete filter unit according to the invention, partly sectioned;

Figure 1:
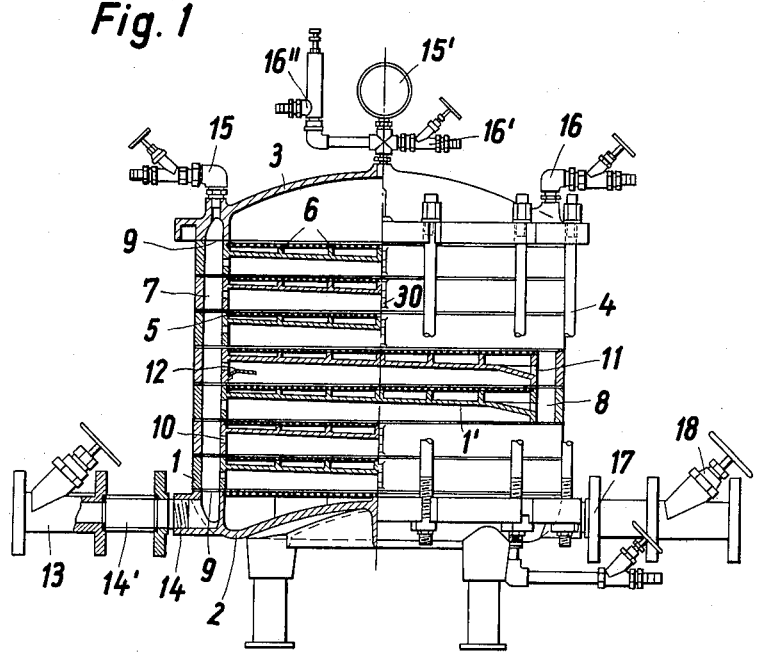

As shown in FIG. 1, the filter apparatus according to the invention is composed of a plurality of filter plates 1, which are held together and secured to a bottom plate 2 and a top plate 3 by means of clamping elements 4, so as to make up a complete filter unit. The filter surfaces are provided with intermediate bottom plates 1' which are impervious to liquid and carry perforated plates or screens 5 supported from projections 6, which are provided on the filtrate side of the intermediate bottoms 1'.

Figure 2:
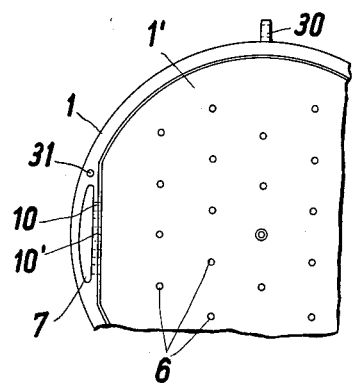
FIGURE 2 is a plan view of a filter plate according to the invention.

At their outer periphery, filter plates 1 have inlet apertures 7 and outlet apertures 8 forming continuous passages in vertical direction of the complete filter unit. For sealing purposes, filter media 9, for instance, filter paper sheets, are placed upon the perforated plates 5. This filter paper has the same shape as the filter plates 1 (FIG. 2) and two holes respectively communicating with the inlet aperture 7 and the outlet aperture 8. The number of filter plates 1 provided between top plate 3 and bottom plate 2 will depend on the size of the complete filter unit.

The liquid to be filtered enters filter plates 1 through entrance holes 10 and leaves the plates 1 through exit holes 11. The cross-sectional areas of entrance holes 10 and exit holes 11 are approximately alike. For filtration of low-viscosity liquids, or to obtain a high output per filter surface unit area, fixed or removable deflectors 12 can be provided at the rear of the entrance holes 10, thus eliminating undesired effects as washing-away of the filter bed. One of the entrance holes is perferably designed as an upright oblong hole 10′, whose lower end extends down to almost the filter paper 9 so that sludge may flow back therethrough upon completion of the filtering process.

The liquid to be filtered or the sludge is conveyed to inlet passages 7 through a one-way or multi-way valve 13 and a tube line 14 with sight glass 14′. Depending upon the particular requirements, the sludge then enters either the bottom plate 2 from the side or from below, or the top plate 3 from the side or from top, or, as an additional alternative, one of the filter plates 1 from the side. In the embodiment shown in FIG. 1, the sludge enters for instance the bottom plate 2 from the side.

Prior to the filtering process, the filter unit is deaerated at both the sludge end and the filtrate end by air-relief cocks 15 and 16, respectively. Conversely, when the filtration process has been completed, gas is directed under pressure into the filter unit preferably through cock 15, whereby the liquid is forced downwards and out of the filter. In many cases, ventilation through the relief cocks without pressure will be sufficient to empty the filter unit. A pressure gage 15′ as well as a relief valve 16′ and a safety valve 16″ are preferably provided on top plate 3.

After the liquid has been passed through the filtering surfaces 9 and the perforated plates 5, it will accumulate on the intermediate bottom plate 1′ of filter plate 1, whence it is conveyed through exit holes 11 to outlet passages 8 and a main outlet tube line 17 having a one-way or multiway valve 18, after which it may be used elsewhere.

Both the feeding tube line 14 and the central outlet tube line 17 may be connected either to bottom plate 2 or to top plate 3, or, alternatively, to one of filter plates 1, depending upon the particular circumstances. Flexible tubing may be used, if tube lines 14 and 17 are not connected to bottom plate 2.

Figure 3:
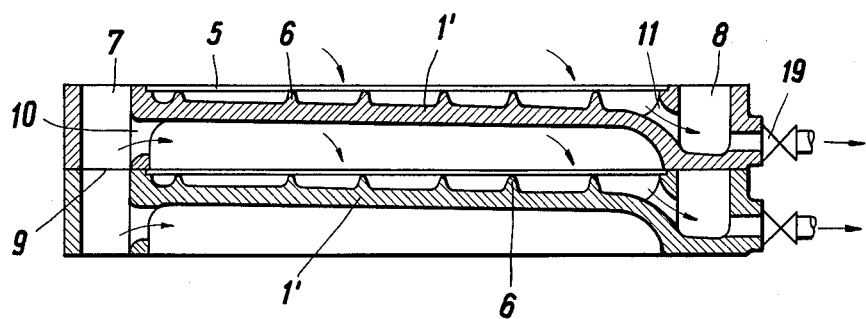
FIGURE 3 is a sectional view of filter plates, each having its own outlet.

In certain cases as in the sugar industry or when various filtering media have to be experimentally tested, it is desirable to provide each of the filter plates 1 with an outlet passage of its own. To this end, each filter plate is provided with a separate outlet passage having an individual exit and a shut-off valve 19, as shown in FIG. 3.

Figure 4:
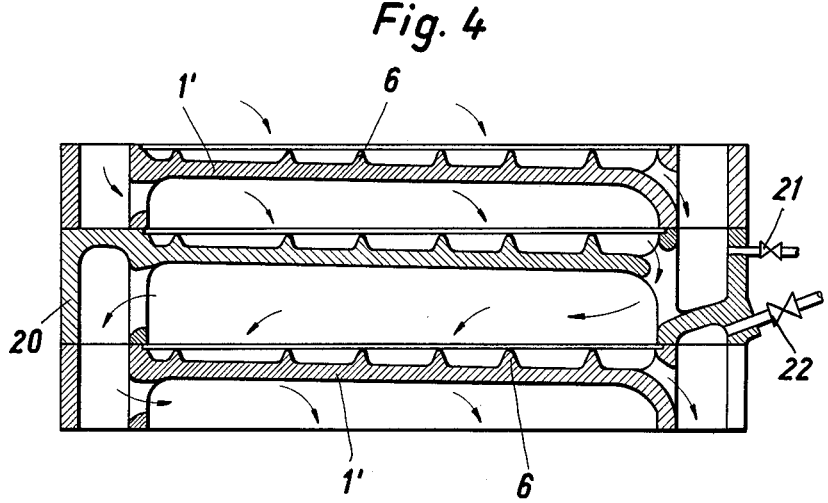
FIGURE 4 is a sectional view of filter plates, one of which being designed to form a deflection plate.

In some cases it may be of advantage or necessary to provide for double filtration as when a liquid has a particularly high percentage of solids or a special structure. In this connection it may also be desirable to provide for both filtration processes at specified conditions. In such cases, the flow-reversing plate 20 (FIG. 4) may be added to a set of standard filter plates, at the same time providing a valve 21 for adding measured quantities of auxiliary filtering means, and an air-relief valve 22 for the filtrate end of the second filtration stage. Depending upon the amount of solids contained in the sludge, different volumes may be desirable above the filter plates. The clearance above the intermediate bottom plates 1′ may therefore be varied. Thus, in a two-stage filtration process, the second stage may be equipped with flatter filter plates.

Figure 5:
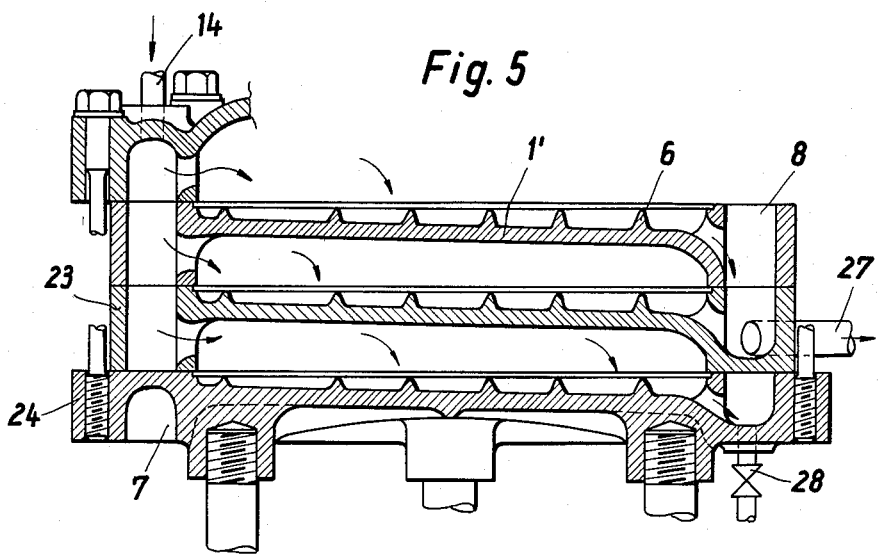
FIGURE 5 is a sectional view of filter plates where the lowest plate directly above the bottom plate has a separate outlet.

It is also possible to empty the filter unit by air via a number of draining plates provided in the lower part of the filter apparatus in such cases where the last residue of the liquid has to be filtered out without thinning, or where the solids have to be reclaimed in dry or semidry state. FIG. 5 shows a combination of draining plates 23, 24, with their inlet passages permanently connected to the sludge side of the filter apparatus. In this embodiment, filter plate 23 has an outlet passage 8 shut off at the lower end, and a lateral connection for the main outlet tube 27 of the filtrate. Bottom plate 24 connects to an inlet passage 7 closed at the upper end as well as to outlet valves 28 at a low point to remove the residual filtrate from the filter unit.

Figure 6:
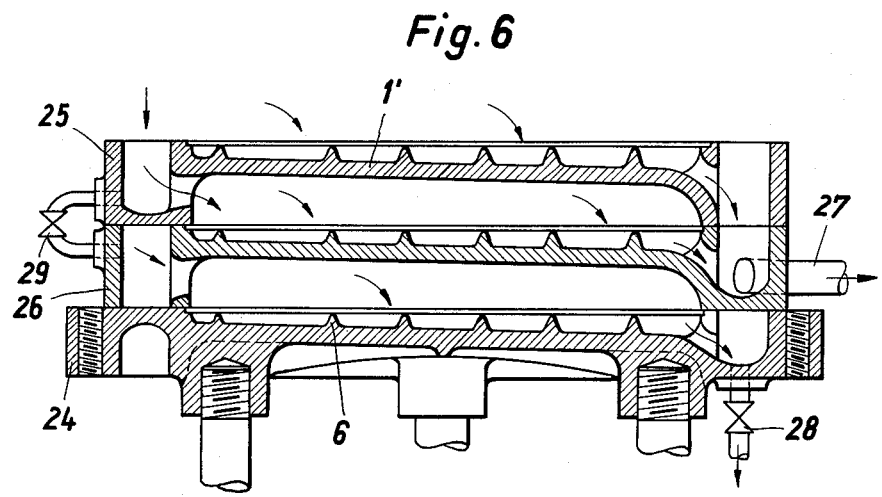
FIGURE 6 is a sectional view of filter plates where the lowest plate has a separate inlet with shut-off valve and the bottom plate has a separate outlet.

FIG. 6 shows a combination of draining plates 24, 25, and 26 having inlets 29 and outlets 28 that may be shut off. Filter plate 25 has an inlet passage which is closed at its lower end and is provided with connections for flexible feed lines 29 which lead to draining plate 26 and can be shut off. Filter plate 26 is of the same type as filter plate 23, but has a connection for feed line 29. The bottom plate 24 is designed as above described. When a preliminary deposit is required, the draining plates are operated in conjunction with the standard filter plates 1, connection 28 interconnecting the outlet passage and the main filtrate outlet 27. During the filtering process, the draining plates are shut off and are thus kept in stand-by condition for the draining process. For convenient manipulation and suspension of the disassembled filter and top plates, each of the plates is provided with lateral pins 30 and a pair of centering pins 31 facilitating the assembly.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the claims.

What is claimed as new and desired to be secured by Letters Patent is:

1. A horizontal plate filter apparatus with external assembly clamping means comprising in combination: a top plate element and a bottom plate element, at least one intermediate element, channel elements with apertures therein, valve means, and filter elements, said top plate element including portions of said channel elements, said valve means being upwardly connected to said portions for filter ventilation, said intermediate element having an intermediate bottom impervious to liquids, said bottom being inclined for liquid discharge, said intermediate element having channel elements open at the top, said channel elements being aligned with said channel portions of said top plate element, raw-liquid apertures in said channel element portions of said intermediate element terminating beneath said inclined intermediate bottoms at one side and clear-liquid apertures terminating above said inclined intermediate bottom at the other side, said apertures being disposed opposite to each other and having corresponding, equal cross-sections, said bottom plate element being disposed beneath said intermediate elements and having an inlet channel element portion aligned with the inlet channel element portions of said intermediate plates, said filter elements being provided between said top and bottom plate elements, and intermediate said intermediate elements and upstanding supporting perforated means mounted on said intermediate bottoms and supporting said filter elements, said filter elements having the same cross-sectional areas as said top and bottom plate elements and said intermediate elements, said filter elements having apertures in channel element zones, the cross-sectional areas of said apertures corresponding to the cross-sectional areas of said channel elements and wherein said channel elements of the intermediate elements are sealed off at the outlet side one against another at their lower portions, each of said channel elements having a separate outlet.

2. A horizontal plate filter apparatus with external assembly clamping means comprising in combination: a top plate element and a bottom plate element, a plurality of stacked intermediate elements therebetween, channel elements with apertures therein, valve means, and filter elements, said top plate element including portions of said channel elements, said valve means being upwardly connected to said portions for filter ventilation, said intermediate elements having intermediate bottoms impervious to liquids, said bottoms being inclined for liquid discharge, said intermediate elements having channel elements open at the top, said channel elements being aligned with said channel portions of said top plate element, raw-liquid apertures in said channel element portions of said intermediate elements terminating beneath said inclined intermediate bottoms at one side and clear-liquid apertures terminating above said inclined intermediate bottoms at the other side, said apertures being disposed opposite to each other and having corresponding, equal cross-sections, said bottom plate element being disposed beneath said intermediate elements and having channel element portions aligned with said channel element portions of said intermediate elements, one of said intermediate elements being a flow-deflection plate, the opposite channel element portions of said plate being sealed off at the top and bottom respectively against the channel element portions of adjacent intermediate elements, the inlet and outlet apertures in said flow-deflection plate respectively opening into and out of the interior of said plate beneath the intermediate bottom thereof, one of said portions of said bottom plate element having a liquid supply aperture, and the other of said portions having a liquid outlet, said filter elements being provided between said top and bottom plate elements and intermediate said intermediate elements, and upstanding supporting means mounted on said intermediate bottoms and supporting said filter elements, said filter elements having the same cross-sectional areas as said top and bottom plate elements and said intermediate elements, said filter elements having apertures in channel element zones, the cross-sectional areas of said apertures corresponding to the cross-sectional areas of said channel elements.

3. A horizontal plate filter apparatus with external assembly clamping means comprising in combination: a top plate element and a bottom plate element, a plurality of stacked intermediate elements therebetween, channel elements with apertures therein, valve means, and filter elements, said top plate element including portions of said channel elements, said valve means being upwardly connected to said portions for filter ventilation, said intermediate elements having intermediate bottoms impervious to liquids, said bottoms being inclined for liquid discharge, said intermediate elements having channel elements open at the top, said channel elements being aligned with said channel portions of said top plate element, raw-liquid apertures in said channel element portions of said intermediate elements terminating beneath said inclined intermediate bottoms at one side and clear-liquid apertures terminating above said inclined intermediate bottoms at the other side, said apertures being disposed opposite to each other and having corresponding, equal cross-sections, said bottom plate element being disposed beneath said intermediate elements and having channel element portions aligned with said channel element portions of said intermediate elements, one of said portions of said bottom plate element having a liquid supply aperture, and the other of said portions having a liquid outlet, the next adjacent intermediate element disposed above said bottom plate element having, at least at one side, channel elements sealed off against adjacent channel elements, said sealed-off channel elements having separate shut-off valve means to shut off said adjacent intermediate element during filtration and to keep said adjacent intermediate element in stand-by condition for later use during the draining process, said filter elements being provided between said top and bottom plate elements and intermediate said intermediate elements, and upstanding supporting means mounted on said intermediate bottoms and supporting said filter elements, said filter elements having the same cross-sectional areas as said top and bottom plate elements and said intermediate elements, said filter elements having apertures in channel element zones, the cross-sectional areas of said apertures corresponding to the cross-sectional areas of said channel elements.

References Cited by the Examiner

UNITED STATES PATENTS

| | | | |
|---|---|---|---|
| 608,655 | 8/1898 | Douglas | 210—344 |
| 863,894 | 8/1907 | Moore | 210—343 X |
| 892,739 | 7/1908 | Knock | 210—343 X |
| 1,433,966 | 10/1922 | Mills | 210—231 |
| 1,891,396 | 12/1932 | Prutzman | 210—344 X |
| 1,971,972 | 8/1934 | Adam | 210—231 |
| 1,976,273 | 10/1934 | White | 210—344 X |
| 2,322,428 | 6/1943 | Eickemeyer | 210—344 X |

FOREIGN PATENTS

| | | |
|---|---|---|
| 514,383 | 10/1952 | Belgium. |
| 126,447 | 5/1919 | Great Britain. |

REUBEN FRIEDMAN, *Primary Examiner.*

HERBERT L. MARTIN, *Examiner.*